UNITED STATES PATENT OFFICE.

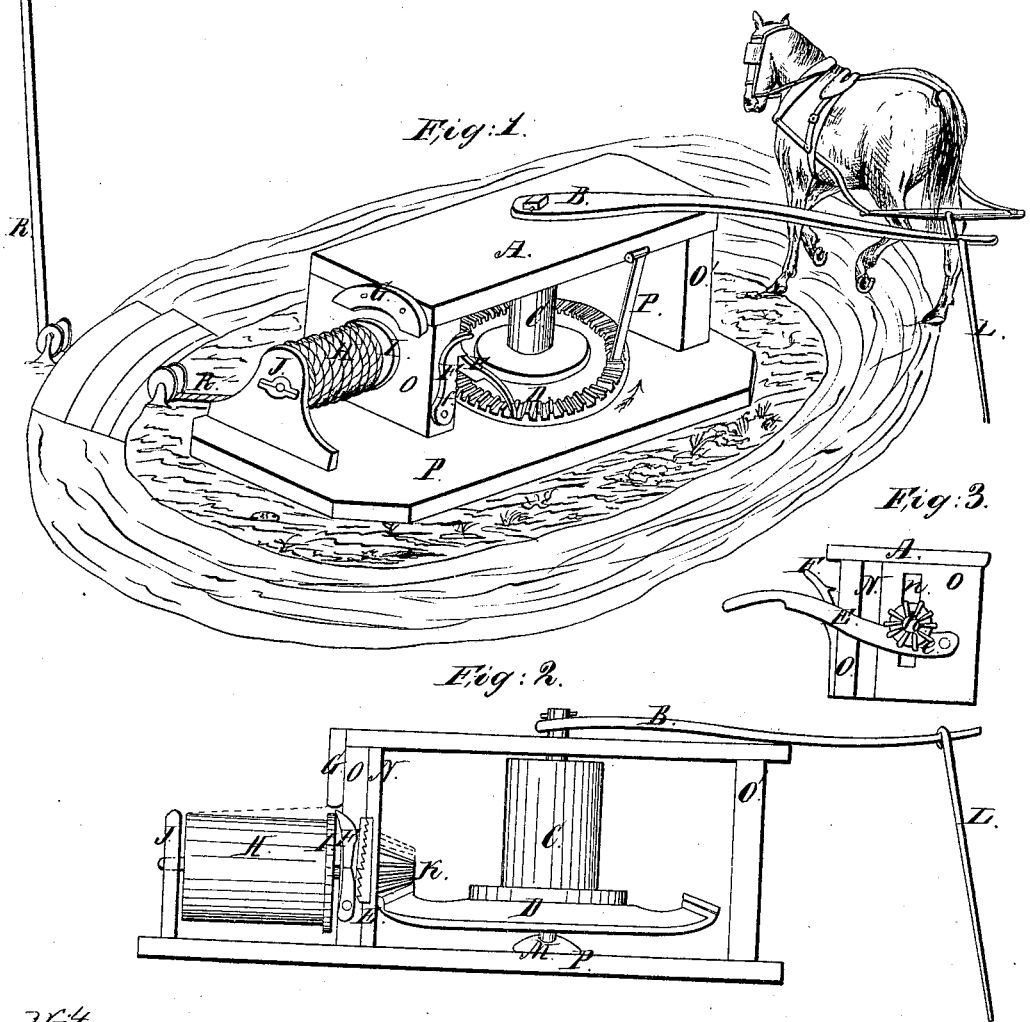

JOHN J. KERSEY, OF BEARSTOWN, ASSIGNOR TO HIMSELF AND ROBERT L. McCLELLAN, OF COCHRANSVILLE, PENNSYLVANIA.

IMPROVEMENT IN WINDLASSES.

Specification forming part of Letters Patent No. 39,367, dated July 28, 1863.

*To all whom it may concern:*

Be it known that I, JOHN J. KERSEY, of Bearstown, in the county of Lancaster and State of Pennsylvania, have invented certain new and useful improvements in the common windlass in use for raising weights by means of horse or other power; and I hereby declare that the following is a full and exact description thereof, reference being had to the accompanying drawings and letters of reference marked thereon, making a part of this specification.

Figure 1 is a perspective view of the windlass with a horse attached, the derrick or crane used in connection therewith not being shown. Fig. 2 is a vertical longitudinal section of the same; Fig. 3, the inside of the end support $o$, with its slot $n$, showing the lever E, its fulcrum or pin $e$, between the upright N and end piece $o$. Said lever supports the pinion K in its adjustable box.

The nature of my invention consists in providing the hoisting-drum H with a cogged bevel-pinion on the inner end of its shaft, and the shaft with the adjustable boxes so connected with a lever as to raise the pinion out of gear with the main wheel, raising the flange of the drum against a permanent or stationary brake simultaneously. This allows the animal to rest in its circular course around the machine while lowering the hoisted box or car of coal, instead of driving the horse straight forward while raising the weight and again backing him while lowering the same, keeping the animal constantly under the draft in hoisting or lowering, as is the customary method now employed along our canals, &c., in unloading coal and the like, for winding and unwinding the rope employed for hoisting.

The construction of my improvement will be readily understood upon inspection of the drawings, as well as its operation.

The lever-arm B, to which the horse is hitched when horse-power is used, operates the shaft G with its horizontal bevel-toothed or cogged wheel D. The pinion K on the shaft of the drum H meshes into said wheel D, and revolves the drum upon which the hoisting-rope R is wound and unwound in raising and lowering the materials hoisted. The boxes for said drum-shaft are of the adjustable kind, allowing of an up-and-down motion. There is a lever, E, connected with the said shaft and boxes, either on the inner side or outer side of the bevel-pinion K, by having the fulcrum $e$ either behind or in front, so that the pinion is lifted out of gear by its means, whether drawn up or pressed down. The drawings illustrate the arrangement adopted.

In order to check the backward motion of the wheel D by the action of the weight, there is a pawl-rod, L, (shown on the long lever-arm B,) dragging after the horse in the roadway, in which it enters on stopping the horse, and arrests the machine. There is also a hinged or hanging paul, P, (shown under the machine,) which is preferable to the rod L, acting as a click over the cogs in D in one direction, and arresting the motion in a contrary direction by acting against the cogs.

To prevent too great a strain on the drum H when its pinion is brought out of gear, there is a stationary brake, G, Fig. 1, against which the flange I on the drum is brought with more or less force to arrest the descending weight while it is being swung round for the purpose of being lowered at the desired point. The horse or power in the meantime may be stopped or in motion, as the action of the drum is now independent from that of the wheel D until again brought into gear by the lever, and held down by means of a holdfast or ratchet, F.

I do not confine myself to a specific ratchet or holdfast, nor to the manner in which the lever is particularly operated, so that the unshifting and action against the stationary brake is simultaneous.

The novelty of this windlass consists in the manner of raising the winding-drum with its pinion out of gear the same time it is brought into check by its flange being pressed upward against a stationary brake.

There may also be novelty in the hanging pawl P or dragging pawl rod L. Otherwise I employ well-known combinations for holding down the machine and operating the crane and motions of the windlass, which I do not consider as any part of my invention.

What I claim as my invention, and desire to secure by Letters Patent, is—

The arrangement of the movable drum H with its flange I, in combination with the stationary brake G, the pinion K on the shaft that revolves the drum, in connection with the shifting-lever E, holdfast or ratchet F, all operating substantially in the manner and for the purpose specified.

JOHN J. KERSEY.

Witnesses:
CHAS. R. FRAILEY,
JACOB STAUFFER.